US005705923A

United States Patent [19]

Johnston et al.

[11] Patent Number: 5,705,923

[45] Date of Patent: Jan. 6, 1998

[54] VARIABLE INDUCTANCE CURRENT LIMITING REACTOR CONTROL SYSTEM FOR ELECTROSTATIC PRECIPITATOR

[75] Inventors: David F. Johnston, Yorktown; Michael McCall Mahler, Hayes; Timothy Gerald Lawrence, Newport News, all of Va.

[73] Assignee: BHA Group, Inc., Kansas City, Mo.

[21] Appl. No.: 338,631

[22] PCT Filed: Mar. 13, 1992

[86] PCT No.: PCT/US92/02028

§ 371 Date: Nov. 22, 1994

§ 102(e) Date: Nov. 22, 1994

[87] PCT Pub. No.: WO93/17791

PCT Pub. Date: Sep. 16, 1993

[51] Int. Cl.[6] .............................. G05B 24/62; H02M 5/42

[52] U.S. Cl. .............................. 323/328; 363/90; 323/903

[58] Field of Search .............................. 323/249, 328, 323/903; 363/86, 90

[56] References Cited

U.S. PATENT DOCUMENTS

| | | | |
|---|---|---|---|
| 3,374,609 | 3/1968 | Kide . | |
| 4,405,965 | 9/1983 | Weldon et al. . | |
| 4,558,271 | 12/1985 | Poole . | |
| 5,068,811 | 11/1991 | Johnston et al. . | |
| 5,515,262 | 5/1996 | Johnston et al. | 363/90 |

*Primary Examiner*—Stuart N. Hecker

*Attorney, Agent, or Firm*—Kokjer, Kircher, Bowman & Johnson

[57] ABSTRACT

A method and apparatus for varying an electrically variable current limiting reactor (VICLR) ( 16) are provided in cooperation with an electrostatic precipitator automatic voltage control system. The inductance of VICLR (16) is varied by altering the DC current in control winding (66) of VICLR (16). A power source (10) connects serially to an inverse parallel SCR1 and SCR2, to VICLR (16), and to a TR set comprising a transformer (18) and rectifier (20) which supply power to precipitator (22). System electrical characteristics on both sides of the TR set are monitored. Computer (40) uses these monitored values to continuously calculate form factor and fractional conduction values. Step-down transformer (60) is connected to solid state relay (62) which is in turn connected to full wave bridge rectifier (64). Rectifier (64) is connected to control winding (66) of VICLR (16). Solid state relay (62) is also connected to computer (40). Solid state relay (62) can be triggered on each half cycle thereby providing DC current pulses to VICLR (16). The number of pulses supplied to said control winding within a predetermined time span can be altered thereby changing the net current in control winding (67) of VICLR (16), and hence, altering the inductance. The number of half cycles applied may be manually altered by an operator or responsive to system operating conditions, including but not limited to, form factor and fractional conduction.

14 Claims, 1 Drawing Sheet

VARIABLE INDUCTANCE CURRENT LIMITING REACTOR CONTROL SYSTEM FOR ELECTROSTATIC PRECIPITATOR

FIELD OF THE INVENTION

This invention relates generally to the control of electrostatic precipitators and, more specifically, concerns the electrical adjustment of an electrically variable current limiting reactor (VICLR) utilized in an electrostatic precipitator control system.

Controlling air pollution is an important environmental goal and is the subject of increasingly strenuous regulation. Electrostatic precipitation, which involves the removal of undesirable particulate matter from a gas stream; is one highly effective air pollution control technique. An electrostatic precipitator is an air pollution control device designed to electrically charge and collect particulates generated from industrial processes. These particulates flow through the precipitator where they are charged. Oppositely charged plates then attract and collect these negatively charged particles. The cleaned gas may then be further treated or discharged to the atmosphere.

Maintaining precipitator collection at its greatest efficiency is an important, yet often difficult task. Conditions under which electrostatic precipitators operate can fluxuate dramatically having a detrimental effect on the operating efficiency of the precipitator. Less than maximum precipitator efficiency results in increased pollution to the atmosphere—perhaps to the point of exceeding regulatory limitations. Accordingly, controlling and maintaining precipitator collection efficiency is an important objective.

BACKGROUND OF THE INVENTION

The background for the present invention is significantly described in U.S. Pat. No. 5,068,811 (the '811 patent), issued Nov. 26, 1991 and entitled "Electrical Control System for an Electrostatic Precipitator" which is incorporated by reference herein. The '811 patent teaches that the waveforms that make up the voltages and currents in the precipitator control system are highly important to precipitator collection efficiency.

More particularly, the '811 patent teaches that two measurements which are highly effective for evaluating waveform shapes, and their effect on the precipitator collection and electrical efficiency, are primary form factor and secondary fractional conduction. Maintaining form factor and fractional conduction at desired levels produces maximum system operating efficiency. This is accomplished through proper sizing of electrical components embodied in the control system. Particularly significant is the appropriate sizing of a current limiting reactor (CLR) utilized by the system.

Generally described, electrical circuitry within the control system as disclosed in the '811 patent monitors system electrical characteristics such as voltages and currents on both the primary and secondary side of a transformer rectifier (TR) set. An input scaling and signal conditioner contains circuitry for manipulating these characteristics into data useful for calculating form factor and fractional conduction. This data is sent from the signal conditioner to a computer with logic and memory capabilities for calculating the form factor and fractional conduction values.

For purposes of the present invention, the input scaling and signal conditioning circuitry and the computer, including the computer's peripheral devices such as display, input/ output port, and keyboard, are collectively referred to as the "automatic voltage control" or AVC. The computer within the AVC is also connected to a SCR firing circuit which is in turn connected to inverse parallel SCRs which are connected serially with a power source. In the most general of terms, these SCRs, when triggered, allow power flow to the overall electrostatic precipitator control system. The SCRs are connected to the CLR which is in turn connected to a transformer rectifier (TR) set which powers the precipitator.

During operation, if the form factor or fractional conduction departs unacceptably from a desired value indicating undesirable and inefficient waveform shapes, the inductive sizing of the CLR is adjusted to yield desired waveforms which in turn result in desired form factor and fractional conduction values, and hence maximum operating efficiency.

The CLR has a fixed inductance value having a number of taps for selecting alternate inductances. Recent advancements in CLR technology allow the present invention to utilize a variable inductance current limiting reactor (VICLR) to shape voltage and current waveforms in the precipitator and to control and limit current entering the precipitator. The VICLR has an electrically variable inductance which is altered in response to the application of direct current (DC) current to the control winding of the VICLR. The utilization of a VICLR is advantageous because it can be easily varied electrically and causes virtually no distortion to the primary current waveform. The VICLR is generally comprised of an inductance winding and a control winding. Increasing the inductance value of the VICLR is accomplished by decreasing the DC current in the control winding, while increasing the DC current in the control winding decreases the inductance value of the VICLR.

As discussed, the '811 patent provides an electrostatic precipitator control system that continuously monitors and responds to changing conditions in the system to maintain maximum precipitator operating efficiency. The utilization of a VICLR with the control system of the '811 patent fulfills the need for a CLR that can be dynamically adjusted in response to changing conditions under which electrostatic precipitators operate. It is important to understand that this combination of components does not comprise the present invention. Rather, it is this combination of components which creates the need for an efficient system for controlling the inductance in response to system operating efficiency.

SUMMARY OF THE INVENTION

The present invention is an efficient mechanism and method for adjusting the VICLR in response to changing precipitator conditions to maintain system operation at the ideal level. An electrostatic precipitator control system as described above in connection with the '811 patent dynamically measures the precipitator operating conditions and compares them with data indicative of theoretically ideal operation. if, based on these comparisons, system operation efficiency has fallen below a desired level, the control system of the present invention adjusts the inductance value of the VICLR by means of a DC current applied to the control winding of the VICLR in pursuit of ideal operation.

In the preferred embodiment of this invention, a 120 alternating current (VAC) power source is connected to a solid state relay, which in turn is connected to the AC input terminal of a standard bridge rectifier. The bridge rectifier converts the AC signal into a DC pulse output signal. The output terminals of the bridge rectifier are connected across the control winding of the VICLR. The solid state relay is also connected to the logic circuitry of the computer within the AVC utilized by the electrostatic precipitator control system. This circuit configuration provides for the application of 120 VDC to the control winding of the VICLR when the solid state relay is on, and for the application of 0 VDC to the control winding when the solid state relay is off.

The VICLR has an associated time constant which varies depending upon the maximum inductive sizing of the device. The speed at which a change of current applied to the control winding appears as a change in impedance of the VICLR is slow. This delay before a step change in the DC current of the control winding appears as a change in the VICLR inductance allows the VICLR to be controlled by the pulsating DC source of the present invention. The time constant of the VICLR effectively smooths, or filters, the output inductance variation.

The solid state relay can be switched or triggered on each half cycle. If it is not switched (i.e., triggered) on during a half cycle, it remains off and power will not flow through the switch. This allows the inductance of the VICLR to be readily changed through the application of DC voltage pulses to the control winding of the VICLR. The 120 VDC output of the solid state relay to the VICLR (through the full wave bridge rectifier) is made up of a number of half cycles. Preferably, 20 half cycles is chosen to match the time constant of the VICLR utilized. For instance, to provide full power to the control winding of the VICLR, the solid state relay is switched on for the full 20 half cycles. To provide one half of full power, the solid state relay is switched on for 10 half cycles and off for 10 half cycles. To provide no power to the VICLR, the solid state relay is switched on for none of the 20 half cycles. It should be understood that 20 half cycles is a preferred number, and other numbers could be chosen. It should also be understood that instead of operating of the basis of half cycles, full cycles or other time periods could be used. It should also be understood that the relationship between power applied to the control winding and inductance is not linear, in other words, one half power does not necessarily equate with one half inductance.

In the present invention, adjustments to the VICLR in the foregoing manner may be accomplished manually by an operator who inputs the number of half cycles into the system or automatically in response to system operating conditions. In automatic operation, the control system makes periodic decisions to increase, decrease, or make no change in the inductance of the VICLR. In general, each of these periodic decisions is made based on a comparison between measured system operating conditions and ideal values or other values, such as operating limits, previously entered into the computer memory of the AVC.

In the preferred embodiment, the decision to change the inductance of the VICLR is made once each second. The inductance of the VICLR is reduced by adding 1 to the number of half cycles on, and subtracting 1 to the number of half cycles off. This increases the net current in the VICLR control winding. The inductance of the VICLR is increased by subtracting 1 from the number of haft cycles on, and adding 1 to the number of haft cycles off. This decreases the net current in the control winding.

Preferably, adjustments are made to reduce the inductance of the VICLR in response to undesirable primary form factor or secondary fractional conduction reading or when the AVC reaches the SCR firing angle limits. Adjustments are preferably made to increase the inductance of the VICLR if the ideal current relationship does not exist between the primary and secondary sides of the TR set. In art ideal precipitator power supply, the ratio between the measured RMS primary current and the rated RMS primary current is equal to the ratio between the measured average secondary current and the rated average secondary current.

Accordingly, it is an object of the present invention to provide an efficient control system for controlling a VICLR in an electrostatic precipitator control system.

It is a further object of the present invention to provide a control system for adjusting a VICLR manually through operator input or automatically in response to ever-changing system conditions.

Another object of the present invention is to provide a control system capable of adjusting the inductance of a VICLR by altering the duration of time that a DC voltage is applied to the control winding of the VICLR.

Another object of the present invention is to provide a control system for adjusting the inductance of a VICLR by altering the number of voltage pulses applied to the VICLR control winding.

Another object of the present invention is to provide a VICLR control which increases the inductance of the VICLR by reducing the number of DC voltage full or half cycles applied to the control winding, and which decreases the inductance of the VICLR by increasing the number of DC voltage full or half cycles applied to the control winding.

Other and further objects of the invention, together with the features of novelty appurtenant thereto, will a become apparent in the course of the following description with reference to the drawings.

DESCRIPTION OF THE DRAWINGS

In the accompanying drawing which forms a part of the specification and is to be read in conjunction therewith, and in which like reference numerals are used to indicate like parts in the various views.

DETAILED DESCRIPTION OF THE INVENTION

Figure 1:
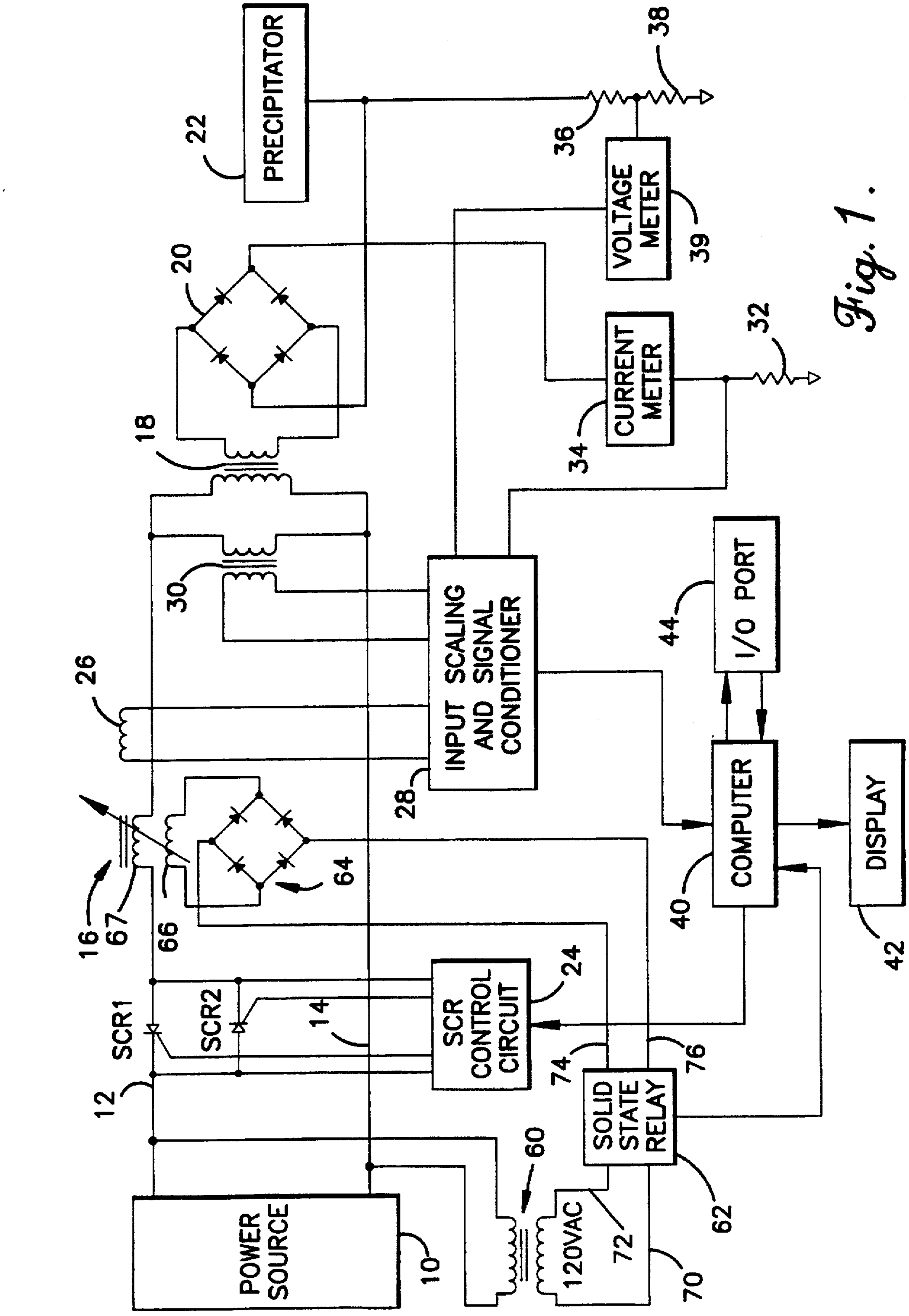
FIG. 1 is a block diagram of an electrical sizing circuit construed in accordance with the preferred embodiment of the present invention for an automatic voltage control including control means for controlling a VICLR.

This invention specifically contemplates controlling the inductance of a variable inductance current limiting reactor (VICLR) through the application of DC voltage pulses to the VICLR. A novel apparatus and method are provided for continuously controlling the inductance of a VICLR in an electrostatic precipitator control system in response to changing system conditions.

FIG. 1 of the present invention shows the preferred embodiment of the electrostatic precipitator AVC of the present invention, particularly, including the 5 components for controlling the inductance of a VICLR. FIG. 1 generally represents the electrostatic precipitator control system disclosed in U.S. Pat. No. 5,068,811 entitled "Electrical Control System for Electrostatic Precipitator" which issued on Nov. 26, 1991. However, as shown in FIG. 1, the present invention adds to this known system voltage step down transformer 60, solid state relay 62, full wave bridge rectifier 64, and all theft interconnections. The present invention also utilizes a VICLR 16 having a control winding 66 and a main winding 67.

A power source 10, typically a 480-volt, single phase, AC power source, has two output terminals 12 and 14. Output terminal 12 connects serially to an inverse parallel SCR 1 and SCR 2, to VICLR 16, and to one side of the primary era step-up transformer 18. Output terminal 14 connects to the other side of the primary of the transformer 18. The secondary of transformer 18 is connected across a full-wave rectifier 20 which supplies power to precipitator 22. Transformer 18 and full wave rectifier 20, in combination, is commonly referred to as the TR set.

The positive output of rectifier 20 passes through a current meter 34 and resistor 32. The resistor 32 connects with an input scaling and signal conditioner 28. The negative output of rectifier 20 connects both to precipitator 22 as well as through a resistor 36 and a resistor 38 to ground. The voltage across resistor 38 is sensed by a voltage meter 39 which is connected to input scaling and signal conditioner 28.

A current transformer 26 senses the input current and sends a signal to input scaling and signal conditioner 28. The primary of a potential transformer 30 is connected across the power input to transformer 18. The secondary of potential transformer 30 is connected to the input scaling and signal conditioner 28.

The output of input scaling and signal conditioner 28 is connected to a computer 40 which is connected to an SCR control circuit 24. Computer 40 is also connected to a display 42 and bi-directionally connected to an input/output port 44. Display 42 may typically comprise an LM4457BG4C40LNY LCD display module such as manufactured by Densitron.

As taught by the '811 patent, input scaling and signal conditioner 28 manipulates the sensed circuit conditions into values useful for calculating form factor and fractional conduction. These values are sent to computer 40 wherein form factor and fractional conduction values are actually calculated.

Primary form factor is the ratio between the RMS value of the primary current and the average value of the primary current. It is known that an ideal sine wave has a form factor of 1.11. The TR set is designed for a specific primary form factor. A value of 1.2 is commonly used. Secondary fractional conduction is the duration of the secondary current wave form in the precipitator divided by the maximum duration possible for the secondary current pulse to be present in the precipitator. This maximum duration is 8.33 milliseconds at 60 Hertz and 10 milliseconds at 50 Hertz. Ideally, fractional conduction is 1. However, the TR set is designed for a specific secondary fractional conduction. A value of 0.86 is commonly used. It should be understood that desired form factor and fractional conduction values may vary with the application and equipment used. Maximum precipitator operating efficiency occurs when form factor and fractional conduction are at or near their designed values.

Referring again to FIG. 1, the components which are particularly applicable to the present invention are described. step-down transformer 60 is connected across output terminals 12 and 14 of power source 10. The output of voltage transformer 60 is preferably 120 volts AC. Output terminals 74 and 76 of solid state relay 62 connect to full wave bridge rectifier 64. Solid state relay 62 is also connected to logic means (not shown) within computer 40. The output of full wave bridge rectifier 64 connects across control winding 66 of VICLR 16.

In operation of the present invention, it is to be understood that the electrostatic precipitator voltage control for calculating form factor and fractional conduction is operational. With respect to the VICLR inductance controller of this invention, the following description is considered preferred operation of the present invention.

Initially, the RMS primary current rating and the average secondary current output rating for the TR set are entered and stored into the memory (not shown) of computer 40. This is accomplished either by an operator through a keyboard (not shown) connected to computer 40, or remotely from a computer through I/O port 44. The SCR firing angle limit chosen for firing of SCR1 and SCR2 is also entered into computer 40. Any other information desired to be stored may also be stored.

During operation of the control system of the present invention, the following parameters are measured:

1) The peak value of the RMS primary current input to the TR set. These values are preferably averaged over approximately 1 second. The peak value is stored in the memory of computer 40 if any operating parameters or spark-over voltages at the precipitator are reached.
2) The form factor of the primary current input to the TR set.
3) The peak value of the average secondary current output of the TR set. These values are preferably averaged over approximately 1 second. This peak value is stored in the memory of computer 40 if any operating parameters or spark-over voltages are reached.
4) The fractional conduction of the secondary current output of the TR set.

In accordance with the present invention, logic circuitry (not shown) within computer 40 periodically compares the foregoing measured values with the entered values in making a decision to increase, decrease, or make no change in the inductance of the VICLR. Preferably, this decision is made once each second. In other words, if system operation departs from desired efficiency as indicated by a difference between the measured and entered values, appropriate action is taken by computer 40 to adjust VICLR 16 so that desired operating efficiency will once again be produced. Understand that because of the continuous nature of this process, any departure from desired efficiency is immediately corrected.

Preferably, the inductance of the VICLR is reduced if the SCR firing angle limit is reached, if the primary form factor is less than 1.2 or if the secondary fractional conduction is greater than 0.86. Again, it is understood that these specific form factor and fractional conduction values result from the sizing of system components, and other values could be used. The inductance is increased if the ideal current relationship does not exist This reduces the secondary current output. In an ideal precipitator power supply, the ratio between the Measured RMS Primary Current and the Rated RMS Primary Current is equal to the ratio between the Measured Average Secondary Current and the Rated Average Secondary Current.

To change the inductance of VICLR 16, the DC current in the control winding 66 of VICLR 16 is varied. Increasing the DC current decreases the inductance while decreasing the DC current increases the inductance. Inherent in VICLR 16 is a time constant. In other words, VICLR 16 is a slow device such that any DC current change in control winding 66 of VICLR 16 does immediately appear as an inductance change in the device, but rather the change in inductance is made over a period of time equal to the time constant of VICLR 16. This time constant varies with VICLRs of different size.

In the circuit configuration of the present invention, solid state relay 62 operates as a highly efficient switch which can be switched on during each half cycle of the AC voltage input entering relay 62 from voltage step-down transformer 60. If solid state relay 62 is not triggered during a half cycle, it remains off and no power is transferred to VICLR 16. As a result, by switching solid state relay 62 on during selected half cycles, a pulsed DC voltage is applied to control winding 66 of VICLR 16 through full wave bridge rectifier 4. It should be understood that this half-cycle switching operation could be on other than a half-cycle basis.

In the preferred embodiment of the present invention, a quantity of 20 DC half cycle voltage pulses is chosen to equal the time constant of the VICLR. It should be understood that 20 half cycles is preferred, but not necessary. Other numbers could have been chosen. In this way, solid state relay 62 can be switched on and off such that the output to control winding 66 of VICLR 16 through full wave bridge rectifier 64 comprises a number of half cycles on and a number of half cycles off. For instance, to provide full power to control winding 66 of VICLR 16, solid state relay 62 is switched on for the full 20 half cycles. To provide one half of full power to control winding 66, solid state relay 62 is switched on for 10 half cycles and off for 10 half cycles. It should be understood that the inductance of VICLR 16 is not linearly related to the power applied to control winding 66. In other words, 50% power does not provide 50% inductance.

Moreover, the present invention is not concerned with the precise variation of inductance. For example, if computer 40 makes the decision to increase inductance and the number of half cycles on and off is accordingly altered, the system immediately makes another decision regarding whether to adjust the VICLR, preferably only a second later. So if the previous increase of inductance was insufficient to overcome undesirable system performance, another half cycle is added in the on state while one off state half cycle is deleted. This process is continuous during operation of the present system.

In the preferred embodiment, computer 40 makes a determination approximately once each second whether the inductance should be changed. This determination is based on the comparisons made between actual and desired performance. As discussed, the inductance of VICLR 16 is reduced by increasing the DC current in control winding 66 of VICLR 16. With the present invention, the inductance of VICLR 16 is reduced by adding 1 to the number of half cycles on, and subtracting 1 from the number of half cycles off. This provides a net increase in the current in control winding 66 of VICLR 16. Accordingly, the inductance will decrease over a period equal to its time constant. Similarly, the inductance of VICLR 16 is increased by subtracting 1 from the number of half cycles on, and adding 1 to the number of half cycles off which provides a net decrease in the current in control winding 66 of VICLR 16.

In an alternate embodiment, an operator may manually control the inductance of VICLR 16 by entering the number of half cycles desired to be applied to control winding 66. This is accomplished through the keyboard (not shown) of computer 40 or remotely through I/0 port 44. Logic within computer 40 allows the operator to select either manual or automatic control. This choice appears on display 42.

From the foregoing it will be seen that this invention is one well adapted to attain all ends and objects hereinabove set forth together with the other advantages which are obvious and inherent to the structure.

It will be understood that certain features and subcombinations are of utility and may be employed without reference to other features and subcombinations. This is contemplated by and is within the scope of the claims.

Since many possible embodiments may be made of the invention without departing from the spirit and scope thereof, it is to be understood that all matter herein set forth or shown in the accompanying drawings is to be interpreted as illustrative and not in a limiting sense.

We claim:

1. An apparatus for varying the inductance of a variable inductance current limiting reactor (VICLR), said VICLR including at least one inductance winding and a control winding, said apparatus comprising:

pulse generating means for providing DC voltage pulse to said control winding of said VICLR including means for varying the inductance of said VICLR by altering the number of said pulses supplied to said control winding within a predetermined periodic time span, wherein varying the inductance of said VICLR alters the shape of an electrical wave form in the apparatus.

2. An apparatus as in claim 1 wherein said pulse generating means comprises: switch means for periodically switching AC voltage input into said switch means into DC voltage output pulses, said apparatus farther comprising rectifying means connected between said switch means and said control winding of said VICLR for rectifying the current applied to said control winding of said VICLR.

3. An apparatus as in claim 2 including means for adjusting the inductance of a VICLR in cooperation with an electrostatic precipitator automatic voltage control system.

4. An apparatus as in claim 3 further comprising means for increasing the inductance of said VICLR by decreasing the number of voltage pulses to said control winding of said VICLR during said periodic time span and means for decreasing the inductance of said VICLR by increasing the number of voltage pulses to said control winding of said VICLR during said periodic time span.

5. An apparatus as in claim 4 wherein the inductance of said VICLR is reduced if the primary form factor of said electrostatic precipitator automatic voltage control system departs from a desired value.

6. An apparatus as in claim 4 wherein the inductance of said VICLR is reduced if the secondary fractional conduction of said electrostatic precipitator automatic voltage control system departs from a desired value.

7. An apparatus as in claim 4 wherein the inductance of said VICLR is reduced if the firing angle limit of SCRs utilized in said electrostatic precipitator automatic voltage control system is reached.

8. An apparatus as in claim 4 wherein the inductance of said VICLR is increased if the current relationship in said electrostatic precipitator automatic voltage control system departs from a desired current relationship.

9. The method of controlling the inductance of a Variable Inductance Current Limiting Reactor (VICLR) in cooperation with an electrostatic precipitator automatic voltage control system, said VICLR having a control winding and at least one inductance winding, said method further comprising: selecting a number of DC voltage pulses in association with a predetermined periodic time span to represent the application of full power to said control winding of said VICLR and wherein applying said selected number of DC voltage pulses to said control winding during one time span of said periodic time span will alter the inductance of said VICLR to its minimum value and wherein applying zero (0) DC voltage pulses to said control winding during one time span of said periodic time span will alter the inductance of said VICLR to its maximum value; and applying a number of said selected number of DC voltage pulses to said control winding of said VICLR wherein the greater the applied number the lesser the inductance of the VICLR.

10. The method as set forth in claim 9 including: obtaining data indicative of the operating efficiency of said electrostatic precipitator automatic voltage control system; and altering the number of said DC voltage pulses applied to said control winding of said VICLR during one time span of said periodic time span if said system departs from a desired efficiency level to change the inductance of the VICLR and increase system operating efficiency.

11. An apparatus for varying the inductance of a variable inductance current limiting reactor (VICLR), said VICLR including at least one inductance winding and a control winding, said apparatus comprising:

a switch;

a power source, for providing AC power, connected to said switch;

a processor connected to said switch;

a rectifier circuit connected between said switch and said control winding of said VICLR for rectifying an electrical current applied to said control winding of said VICLR, wherein said processor controls said switch to output, through said rectifier circuit to the control winding of said VICLR, a series of DC voltage pulses within a periodic time frame, to thereby control the inductance of said VICLR.

12. The apparatus as set forth in claim 11 in combination with an electrostatic precipitator automatic voltage control system.

13. The apparatus as set forth in claim 11 wherein said switch comprises a solid state relay.

14. The apparatus as set forth in claim 11, further comprising:

at least one meter for measuring an electrical characteristic, wherein said processor controls said switch based upon the characteristic measured.

* * * * *